(12) United States Patent
Schultheis et al.

(10) Patent No.: US 11,899,257 B2
(45) Date of Patent: Feb. 13, 2024

(54) OPTICAL-ELECTRICAL CONDUCTOR ASSEMBLY COMPRISING AN OPTICAL WAVEGUIDE AND AN ELECTRICALLY CONDUCTIVE LAYER

(71) Applicant: SCHOTT AG, Mainz (DE)

(72) Inventors: Bernd Schultheis, Schwabenheim (DE); Oliver Keiper, Hünstetten (DE); Christian Henn, Frei-Laubersheim (DE)

(73) Assignee: SCHOTT AG, Mainz (DE)

( * ) Notice: Subject to any disclaimer, the term of this patent is extended or adjusted under 35 U.S.C. 154(b) by 0 days.

(21) Appl. No.: 17/159,575

(22) Filed: Jan. 27, 2021

(65) Prior Publication Data

US 2021/0149135 A1 May 20, 2021

Related U.S. Application Data

(63) Continuation of application No. PCT/EP2019/070264, filed on Jul. 26, 2019.

(30) Foreign Application Priority Data

Jul. 27, 2018 (DE) ..................... 10 2018 118 225.2

(51) Int. Cl.
*G02B 6/44* (2006.01)
*H01B 11/22* (2006.01)

(52) U.S. Cl.
CPC ........... *G02B 6/443* (2013.01); *G02B 6/4486* (2013.01); *H01B 11/22* (2013.01)

(58) Field of Classification Search
None
See application file for complete search history.

(56) References Cited

U.S. PATENT DOCUMENTS

| 4,337,279 A | 6/1982 | Polak |
| 4,418,984 A | 12/1983 | Wysocki |
| 4,525,026 A * | 6/1985 | Elion .................... G02B 6/4401 385/128 |
| 4,609,437 A | 9/1986 | Kruishoop |
| 5,128,213 A * | 7/1992 | Tanaka .................... F16C 33/04 75/231 |

(Continued)

FOREIGN PATENT DOCUMENTS

| CN | 1199471 | 11/1998 |
| CN | 101370956 | 2/2009 |

(Continued)

OTHER PUBLICATIONS

ASTM F 2252.

(Continued)

*Primary Examiner* — Chad H Smith
(74) *Attorney, Agent, or Firm* — Ruggiero McAllister & McMahon LLC

(57) ABSTRACT

An optical-electrical conductor assembly is provided that includes an optical waveguide that has an outer organic jacket layer and a functional layer system disposed on the outer jacket layer of the optical waveguide. The functional later has a base layer portion with a single layer or a sequence of layers and an electrically conductive layer disposed on the base layer portion. The electrically conductive layer has a single layer or a sequence of layers.

17 Claims, 1 Drawing Sheet

(56) References Cited

U.S. PATENT DOCUMENTS

| | | | |
|---|---|---|---|
| 5,135,295 | A | 8/1992 | Jen |
| 5,497,442 | A | 3/1996 | Roos |
| 6,011,887 | A | 1/2000 | Kamei |
| 6,122,934 | A * | 9/2000 | Narita .................... G02B 6/132 65/379 |
| 6,472,072 | B1 | 10/2002 | Ebisawa |
| 9,242,100 | B2 | 1/2016 | Walsh |
| 2004/0109650 | A1* | 6/2004 | Kim .................... G02B 6/4483 385/100 |
| 2004/0132237 | A1* | 7/2004 | Kanemoto ........ H01L 29/66545 438/303 |
| 2008/0070050 | A1 | 3/2008 | Urbain |
| 2008/0192778 | A1 | 8/2008 | Ohsono |
| 2009/0296018 | A1 | 12/2009 | Haerle |
| 2010/0044106 | A1 | 2/2010 | Zediker |
| 2010/0057179 | A1* | 3/2010 | Storey .................... C23C 14/20 607/119 |
| 2010/0215326 | A1* | 8/2010 | Zediker .................... E21B 7/15 385/100 |
| 2015/0292699 | A1 | 10/2015 | Woelfing |
| 2017/0276869 | A1* | 9/2017 | Setmire ............. G02B 6/02395 |
| 2018/0273427 | A1* | 9/2018 | Tanaka .................. C03C 25/105 |

FOREIGN PATENT DOCUMENTS

| | | |
|---|---|---|
| DE | 102006029203 | 12/2007 |
| DE | 102012109088 | 5/2014 |
| DE | 102015200691 | 7/2016 |
| EP | 0859256 * | 8/1997 |
| JP | S5576306 | 6/1980 |
| JP | S57124303 | 8/1982 |
| JP | S57124308 | 8/1982 |
| JP | S57145047 | 9/1982 |
| JP | S6134513 | 8/1986 |
| JP | S6296672 | 5/1987 |
| JP | 2000096213 | 4/2000 |
| JP | 2000229377 | 8/2000 |
| JP | 2001305398 | 10/2001 |
| JP | 2004076012 | 3/2004 |
| JP | 2005208025 | 8/2005 |
| JP | 2008141066 | 6/2008 |
| JP | 2008292660 | 12/2008 |
| JP | 2017008380 | 1/2017 |
| NL | 9002602 * | 11/1990 |
| WO | 9422039 | 9/1994 |
| WO | 2016019578 | 2/2016 |
| WO | 2017120400 | 7/2017 |

OTHER PUBLICATIONS

DIN 58196-6 (Jul. 1995) with English translation.
ISO 10993-1 with English translation.
English translation of DIN EN ISO 14577-4.
International Search Report dated Oct. 10, 2019 for PCT/EP2019/070264.
International Preliminary Report on Patentability Chapter II dated Jan. 6, 2021 for PCT/EP2019/070264.

* cited by examiner

OPTICAL-ELECTRICAL CONDUCTOR ASSEMBLY COMPRISING AN OPTICAL WAVEGUIDE AND AN ELECTRICALLY CONDUCTIVE LAYER

CROSS REFERENCE TO RELATED APPLICATIONS

This application is a continuation of International Application PCT/EP2019/070264 filed on Jul. 26, 2019, which claims benefit under 35 USC § 119 of German Application 10 2018 118 225.2 filed Jul. 27, 2018, the entire contents of all of which are incorporated herein by reference.

BACKGROUND

1. Field of the Invention

The invention relates to an optical-electrical conductor assembly comprising an optical waveguide and an electrically conductive layer that is disposed on an outer jacket layer of the optical waveguide. The invention also relates to a method for producing an optical-electrical conductor assembly comprising an optical waveguide and an electrically conductive layer.

2. Description of Related Art

Optical waveguides are used to transmit light or energy for numerous applications. Sometimes, it is desirable to provide for the transmission of electrical signals in addition to the transmission of light, for example in order to be able to detect damage to the optical waveguide or fiber breakage.

German patent application DE 10 2012 109 088 A1, for example, describes a fiber-optic conversion module that forms part of a lighting device in a vehicle, and which may use optical fibers with an electrically conductive coating to allow detection of a break in optical fibers. A break in an optical fiber causes an interruption of an electrical circuit path, which can be detected by detection means based on lacking or dropping current and is used to switch off excitation light sources.

German patent application DE 10 2006 029 203 A1 relates to a light-emitting device comprising an optical waveguide. An electrically conductive connection may be provided on the surface of the jacket area of the optical waveguide, which is wound around the jacket area or disposed circumferentially around the optical waveguide so as to be capable of detecting possible damage or breakage of the optical waveguide at various points.

U.S. Pat. No. 5,135,295 discloses piezoelectric and ultrasonic devices which use optical fibers that are coated with thin piezoelectric and ferroelectric lead-zirconate-titanate (PZT) films. The PZT thin films are produced chemically using a sol-gel process.

SUMMARY

The invention is based on the object of providing optical waveguides which comprise an electrically conductive layer and which are optimized in particular in terms of their manufacture and quality. One aspect of the object of the invention is to provide conductive coatings in particular on the polymer jackets that are commonly used in optical waveguides, which requires to take into account the usually low temperature resistance thereof.

An optical-electrical conductor assembly is provided, which comprises an optical waveguide with an outer organic layer. A functional layer system is located on the outer jacket layer and comprises a base layer portion and an electrically conductive layer disposed on the base layer portion. The base layer portion may consist of a single layer or a sequence of layers. The electrically conductive layer may also consist of a single layer or a sequence of layers.

In addition to light transmission, this additionally provides for the transmission of electrical signals. Furthermore, fiber break monitoring or detection of damage to the fiber is made possible (safety function). Moreover, this provides a protective effect for the fiber, e.g. for the case where laser light is reflected back.

The optical waveguide which has the functional layer system disposed on its outer jacket layer can be configured in different ways, as is known to those skilled in the art. Typically, the optical waveguide comprises at least an optically conductive core, preferably made of glass, in particular fused silica, into which electromagnetic radiation can be injected, for example by a laser. The core may be directly enclosed by a cladding which is disposed between the core and the outer jacket layer. This cladding may also be made of fused silica. The inner core has a greater refractive index than the cladding in this case. The core preferably has a diameter from 10 to 600 µm, the cladding typically has a diameter corresponding to 1.1 to 1.5 times the core diameter, the wall thickness of the cladding layer preferably ranges from 1 to 100 µm. It may also be contemplated for the inner core to be directly enclosed by the outer jacket layer. In this case, the refractive index of the core is greater than that of the jacket layer.

In one embodiment it may also be contemplated that the functional layer system is disposed directly on the optically conductive core. In this embodiment, the optical waveguide accordingly does not comprise an outer jacket layer. In other words, a pure fused silica fiber may be provided, for example, and the functional layers are disposed directly thereon and may in particular be completed by a final polymer layer.

The organic jacket layer enclosing the core, which may also be in the form of a sizing, preferably comprises or is made of at least one material selected from the group consisting of polyamide (PA), polyimide (PI), polymethyl methacrylate (PMMA), wax, wax-like components, alkylsilane.

According to the invention, the functional layer system on the cladding layer comprises a base layer portion disposed below the conductive layer. The base layer portion may be provided in the form of a layer disposed on the outer jacket layer and comprising an oxide, in particular selected from $SiO_2$, $TiO_2$, $Al_2O_3$, $SnO_2$, $HfO_2$, or a boride, carbide, nitride, oxynitride, carbonitride, or a metal, in particular Si, Ti, Mo, or Cr, or in the form of a sequence of such layers applied on the outer jacket layer. In other words, the outer jacket layer may be coated with a single layer or a plurality of layers defining the base layer portion. Such a layer or layer sequence may be producible or produced by a coating process as will be discussed in more detail further below. The base layer portion may in particular be formed as an inorganic adhesion promoting layer based on oxides, such as $SiO_2$, $TiO_2$, $Al_2O_3$, $SnO_2$, $HfO_2$, etc., borides, carbides, nitrides, oxynitrides, carbonitrides, or metals such as, e.g., Si, Ti, Mo, or Cr, in the form of a single layer or a layer sequence made from these materials. Preferred layer systems include $TiO_2$. In other words, the base layer portion preferably contains $TiO_2$ and in particular comprises a plurality of layers, with at least one of these layers containing $TiO_2$. These coatings may be applied by a sputter deposition process using a sputter target, and the materials may be provided in the form of metallic targets or partially ceramic targets. Typically, a purity of the targets is specified to be 99% or more. However, lower purities are also possible. In the latter case, higher layer thicknesses may be required.

According to another embodiment, the base layer portion may comprise a near-surface zone of the outer jacket layer having at least one modified surface property, in particular increased surface energy and/or an increased number of oxygen radicals. Such a superficial sublayer or near-surface zone of the cladding layer may be producible or produced by chemical or physical processes in order to alter the surface properties of the jacket layer, in particular by plasma treatment (e.g. low-pressure plasma or atmospheric plasma), UV treatment, arc (corona) discharge, and/or by chemical treatment such as by alkaline cleaners in an ultrasonic bath, or by a combination of such processes, as will be discussed in more detail further below. In other words, the base layer portion or a lowermost layer of the base layer portion may be defined by a radial portion of the outer jacket layer encompassing the outer surface thereof. Thus, the base layer portion may consist of a single layer, for example, and this single layer is defined by chemical or physical processes with regard to surface properties on the basis of the outer jacket layer of the optical waveguide. However, the base layer portion may also consist of a sequence of layers, with the lowermost layer of the base layer portion being defined by chemical or physical processes with regard to surface properties on the basis of the outer jacket layer of the optical waveguide, and with further layers disposed on this lowermost layer.

Accordingly, it may also be contemplated for the base layer portion to consist of a plurality of layers, with a lowermost layer in the form of such a near-surface zone of the outer jacket layer, and with at least one further layer of the base layer portion thereabove in the form of a layer deposited on the outer jacket layer. Such a multi-layer base layer portion may for instance be producible or produced by first treating the jacket layer at least in sections thereof, for example by plasma treatment, UV treatment, arc discharge, and/or by chemical treatment, and then coating the jacket layer using a coating process. On the one hand, the treatment increases the surface energy, and on the other hand it preferably generates free oxygen radicals which ensure good adhesion of the subsequent coatings. The treatments are preferably performed over the entire surface of the fiber, that is the surface of the optical waveguide with the jacket layer. Further layers may be disposed on the layer deposited by coating processes.

The base layer portion preferably has a thickness between 5 nm and 3000 nm, more preferably between 5 nm and 1000 nm, most preferably between 10 nm and 100 nm. Furthermore, the individual layers of the base layer portion may each have a thickness between 5 nm and 1000 nm, preferably between 10 nm and 100 nm. For example, an at least two-layer base layer portion may be provided, the lower layer being in the form of a near-surface zone of the outer jacket layer, and a layer deposited thereon has a thickness between 5 nm and 1000 nm, preferably between 10 nm and 100 nm. The layer thickness may be predetermined as a function of the thermal expansion coefficient of the optical waveguide to be coated or its outer polymer layer in comparison to the thermal expansion coefficient of the conductive layer.

The base layer portion may in particular be provided in the form of an adhesion promoting layer. Accordingly, it may be contemplated that there is greater adhesion between the base layer portion and the conductive layer applied thereon than would exist between the outer jacket layer and an identical conductive layer disposed thereon. Good adhesion results mean, for example, that a so-called tape test (printing ink adhesion) as according to ASTM F 2252/Sun Chemical-Hartmann PV 01 can be met. In this test, an adhesive tape is disposed on the coated fibers and peeled off evenly at a defined angle. If there is no coating on the adhesive tape after it has been peeled off and if there is no delamination arising from the coating, the test is considered to have been passed. Adhesion can also be verified with an adhesion test according to DIN 58196-6 (1995-07). In other words, increased adhesion can be provided between the conductive layer, in particular the lowermost layer of the conductive layer, and the uppermost layer of the base layer portion disposed therebelow, which may be in the form of a near-surface zone of the outer jacket layer exhibiting increased surface energy and/or an increased number of oxygen radicals, or of a layer deposited on the jacket layer. It is also possible for the base layer portion to consist of a plurality of layers, in which case at least one or each of the layers applied above the lowermost layer exhibits better adhesion to the layer below than it would exhibit to the layer disposed below that layer below.

Furthermore, the base layer portion may be in the form of a barrier layer. Accordingly, it may be contemplated that the base layer portion, in particular at least one of the layers of the base layer portion disposed on the outer jacket layer by coating, inhibits or blocks diffusion of polymer constituents such as acids and/or oxygen and in particular of ions of acidic or alkaline solutions into the conductive layer. Accordingly, the base layer portion is capable of delaying or preventing permeation of, e.g., acids, oxygen, and also of other constituents of air into the lower surface of the conductive layer. In particular in the reprocessing of medical products, alkaline cleaning or disinfecting agents (e.g. NEO-DISHER with a pH of about 11) may be used. Furthermore, the detergent sodium hypochlorite (NaClO) can be used, which is a bleaching or disinfecting agent.

The base layer portion preferably has a coefficient of thermal expansion which is between the coefficient of thermal expansion of the jacket layer and the coefficient of thermal expansion of the conductive layer. For a given coefficient of thermal expansion (CTE) of the jacket layer, which may be in the range of >15*E−6 1/K, for example, the properties of the base layers can be selected depending on the conductive layer that is used. If, for example, a molybdenum coating is used as the conductive layer, which typically has a CTE of 5-6*E−6 1/K, it is possible to choose a base layer portion with a higher CTE. One example that could be considered in this case would be a $TiO_2$ coating with a CTE of 7-8*E−6 1/K. Preferably, it may be contemplated that the coefficient of thermal expansion of the jacket layer is greater than the coefficient of thermal expansion of the base layer portion. Furthermore, it may be contemplated that the coefficient of thermal expansion of the base layer portion is greater than or equal to the coefficient of thermal expansion of the conductive layer. In the case of a multilayer base layer portion, this applies to at least one of its layers. Furthermore, it may be contemplated that the base layer portion comprises a sequence of layers having a respective coefficient of thermal expansion that increases or decreases in accordance with the sequence of layers. It is also possible to obtain a gradient in the coefficient of thermal expansion (CTE) through a quasi-continuous alteration in the composition. The selection of the materials of the base layer portion can be determined depending on the thermal expansion coefficient of the optical waveguide or its outer polymer layer to be coated in comparison to the thermal expansion coefficient of the conductive layer.

The conductive layer disposed on the base layer portion preferably comprises a layer containing a material selected from titanium, silicon (optionally doped with n- or p-conductive dopants to increase its intrinsic conductivity), aluminum, gold, silver, molybdenum, tungsten, zirconium, in particular an alloy of any one of these materials with Ni, Zn, Y, Sn, Ge, or a sequence of such layers. Ti and Mo have turned out to be particularly preferable. A layer comprising or made of molybdenum is therefore particularly preferred, for example. In other words, the conductive layer may consist of a single layer or a sequence of layers, and at least one layer is made of titanium, (doped) silicon, aluminum, gold, silver, molybdenum, tungsten, zirconium, or alloys of at least one of the aforementioned conductive materials, Ni and its alloys, Zn, Y, Sn, Ge. Such a layer or layer sequence may, for example, be producible or produced by a coating process as will be discussed in more detail further below.

The conductive layer disposed on the base layer portion may also comprise or be made of Ag, Cu, Cr, Ni, ITO, however, requirements of biocompatibility and cytotoxicity (ISO 10993-5:2009) must be observed in the field of medical technology.

The conductive layer preferably has a thickness between 5 nm and 6000 nm, more preferably between 5 nm and 2000 nm, most preferably between 10 nm and 200 nm. Furthermore, at least one of the layers or each of the layers of the conductive layer may have a thickness between 5 nm and 2000 nm, preferably between 10 nm and 200 nm. The layer thickness may be predetermined depending on the electrical resistance or sheet resistance to be achieved, and within particular layer thickness ranges the sheet resistance is inversely proportional to the layer thickness of the conductive layer. A layer thickness of at least 5 nm has the advantage that the risk of island formation (coating only in areas) is avoided and therefore a contiguous layer is produced. In the case of island formation there will be no uniform conductivity resulting because of the insulating areas around the conductive "islands". However, where appropriate, layer thicknesses of at least 3 nm may also be sufficient.

The conductive layer preferably has a sheet resistance between 0.01 and 1000, more preferably between 0.01 and 100, most preferably between 0.01 and 50 ohms/sq (the unit ohms/sq corresponds to the unit ohm). Sheet resistance is understood to mean the specific electrical resistance divided by the layer thickness. For example, the following applies to the specific electrical resistance: Ti: 8 E-5 ohm·cm; Si: 2 ohm·cm; Au: 6 E-8 ohm·cm; Ag: 1 E-5 ohm·cm; Mo: 4.9 E-5 ohm·cm. A thin 200 nm Ti coating has a sheet resistance of 3.9 ohms/sq. This gives a specific resistance of 7.8*E-5 ohm·cm.

Besides the base layer portion and the conductive layer, the functional layer system may furthermore comprise a barrier layer (passivation layer) disposed on the conductive layer, and this barrier layer may consist of a single layer or a sequence of layers. The barrier layer is adapted to inhibit or block diffusion of oxygen and/or acids/bases, in particular of ions from acidic or alkaline solutions, into the conductive layer. Alkaline cleaners are sometimes used in the reprocessing of medical products (e.g. NEODISHER with a pH of about 11). Also, the detergent sodium hypochlorite (NaClO) might be employed, which is a bleaching or disinfecting agent. Accordingly, the barrier layer will be capable of delaying or preventing permeation of, for example, acids, oxygen, and also of other constituents of the air from entering the upper surface of the conductive layer. Moreover, the barrier coating is able to ensure that mechanical impacts on the conductive layer or the fiber can be reduced and thus provides a mechanically protective film. So, in combination with an appropriate base layer portion, the conductive layer will thus be protected against undesired diffusion on both sides. One embodiment accordingly relates to an optical-electrical conductor assembly comprising an optical waveguide having an outer organic jacket layer; a functional layer system disposed on the outer jacket layer of the optical waveguide, comprising: a base layer portion consisting of a single layer or a sequence of layers, defined by or comprising a near-surface zone of the outer jacket layer having at least one altered surface property; and an electrically conductive layer disposed on the base layer portion and consisting of a single layer or a sequence of layers; and a barrier layer disposed on the conductive layer and consisting of a single layer or a sequence of layers, wherein the barrier layer is adapted to inhibit diffusion of oxygen and/or ions from acidic or alkaline solutions into the conductive layer; and/or a layer encompassed in the base layer portion, which is adapted to inhibit diffusion of polymer constituents, oxygen and/or ions from acidic or alkaline solutions into the conductive layer.

One embodiment accordingly comprises a barrier layer disposed on the conductive layer and/or a barrier layer encompassed in the base layer portion, which are each in particular adapted to inhibit diffusion of oxygen, ions from acidic or alkaline solutions, and/or of polymer constituents into the conductive layer.

The barrier layer or at least one of the layers of the barrier layer preferably has a hardness of at least 800 HV, preferably at least 1200 HV, most preferably at least 2000 HV in compliance with the DIN EN ISO 14577-4:2007-8 test standard. Thus, the barrier layer can also provide a mechanically protective layer for the conductive layer, in particular for a metallic layer, and/or a protection for the optical waveguide or the jacket layer (buffer material). In particular hard materials made of carbides or nitrides are protective, due to their elevated hardness, for example AlN: HV up to approx. 2000, $Si_3N_4$: HV up to approx. 2500.

The barrier layer preferably comprises a layer disposed on the conductive layer, comprising a nitride, in particular $Si_3N_4$, BN, AlN, TiN, AlSiN, SiON, SiAlON, or an alloy of any one of these substances, or comprising an oxide, in particular oxides of Si, Al, Ti, Zr, Zn, Sn, Ta, Nb, Y, or a ternary system comprising at least one of these substances, or comprising a carbide, boride, oxynitride, carbonitride, or a sequence of such layers disposed on the conductive layer. Layers comprising $TiO_2$, TiN, $Si_3N_4$, or $SiO_2$ turned out to be particularly suitable. Due to the CTE relationships mentioned above, barrier coatings with a CTE comparable to that of the conductive layer should preferably be used. In other words, the coefficient of thermal expansion of the barrier layer may correspond to 0.5 to 2 times, preferably 0.75 to 1.25 times the coefficient of thermal expansion of the conductive layer. Furthermore, the barrier layer may also consist of a single layer or of a sequence of layers. Preferably at least one layer of the barrier layer is made of nitride, e.g. $Si_3N_4$, BN, AlN, TiN, AlSiN, or of an alloy of any one of the nitrides mentioned. Such a layer is particularly suitable for inhibiting the diffusion of atmospheric oxygen and also has the advantage of being relatively hard. Furthermore, at least one layer, in particular a further layer, is preferably made of oxide, in particular of oxides of Si, Al, Ti, Zr, Zn, Sn, Ta, Nb, or of a ternary system comprising at least one of these substances. Such a layer in particular provides a good barrier to acids. For one of the layers, preferably a further layer, carbides, borides, oxynitrides, carbonitrides may be employed. Furthermore, it is in principle possible for the barrier layer and/or for one of the layers of the barrier layer to use the materials that can also be used for the base layer portion, and these materials will in particular depend on the chemical or atmospheric requirements on such an optical-electrical conductor assembly or fiber or on components comprising such an optical-electrical conductor assembly or fiber. A layer or layer sequence can, for example, be producible or produced by a coating process as will be explained in more detail further below.

The base layer portion, the conductive layer and/or an optionally provided barrier layer extend at least over some areas or portions in the axial direction of the optical waveguide.

The base layer portion may have an amorphous structure, in particular if the base layer portion is defined by a near-surface sublayer of the jacket layer. The base layer portion may also have a crystalline or polycrystalline structure, in particular if the base layer portion comprises a layer deposited by coating. The conductive layer and/or an optionally provided barrier layer may likewise have a crystalline or polycrystalline or optionally also an amorphous structure. Amorphous layers are preferred for the base layer portion and for the barrier layer in order to ensure a particularly good diffusion barrier. Typical examples of amorphous diffusion barriers include $SiO_2$, $Si_3N$, $Al_2O_3$, $AlSiO_x$ or BN, typical examples of crystalline barrier coatings are anatase or rutile $TiO_2$, $\gamma$-$Al_2O_3$, or crystalline AlN. In particular mixed amorphous and crystalline phases should be mentioned as well.

The described opto-electrical conductor assembly may additionally comprise a tubing, at least partially or in sections thereof, that is to say it may be surrounded by a final outer jacket, and this final outer jacket may surround the assembly tightly or loosely. For a distal section of the optical-electrical conductor assembly it may be intended to be stripped or to remain. The tubing may accordingly extend over the majority of the length of the opto-electrical conductor assembly, while a portion of the opto-electrical conductor assembly, in particular an end of the assembly, has no tubing.

The invention furthermore provides a method for producing an optical-electrical conductor assembly, which comprises providing an optical waveguide with an outer jacket layer and coating the jacket layer of the optical waveguide with a functional layer system. The coating with a functional layer system comprises first producing a base layer portion consisting of a single layer or a sequence of layers, and then depositing (on the base layer portion) an electrically conductive layer consisting of a single layer or a sequence of layers.

The producing of the base layer portion may, on the one hand, comprise to pretreat the jacket layer of the optical waveguide in order to produce a near-surface zone that has at least one altered surface property, in particular a near-surface zone having an increased surface energy and/or an increased number of oxygen radicals, and/or in order to remove residues.

On the other hand, the producing of the base layer portion may comprise to deposit (on the outer jacket layer) a layer or a sequence of layers, in particular by using cathode sputter deposition, high-frequency sputter deposition, reactive sputter deposition, and/or magnetron sputter deposition. Besides cathode sputter deposition, other coating techniques may be employed, in particular vacuum processes (e.g. vapor deposition, chemical vapor deposition (CVD, e.g. PECVD, especially PICVD)). Further coating techniques that are eligible for depositing one or more layers of the base layer portion include processes from a liquid phase, e.g. dip-coating or spray-coating. This allows to achieve additional functionalization such as a reduction in the coefficient of friction.

The pre-treating of the jacket layer in order to create the base layer portion or the lowermost layer of the base layer portion may be achieved by chemical or physical processes for altering the surface properties of the jacket layer. Pre-treating of the jacket layer, that is the surface to be coated, provides for good layer adhesion. In particular plasma pretreatment (low-pressure plasma or atmospheric plasma), arc (corona) discharge, and/or chemical pretreatment, e.g. using alkaline cleaners in an ultrasonic bath, allow to generate high surface energies, at least temporarily, so that adhesion can be significantly improved. Plasma can also be used to remove fats, oils, or similar residues, and additionally to activate oxygen radicals. However, it is also possible to combine pretreatment techniques.

It may also be contemplated to first produce a lower layer of the base layer portion by pretreating the jacket layer of the optical waveguide as described above, and then to apply at least one further layer of the base layer portion on this lower layer, in particular by employing the sputter deposition techniques mentioned above (or other coating processes). The method step is in particular suitable to produce a base layer portion as described in conjunction with the optical-electrical conductor assembly.

A method variant, for example, relates to a method for producing an optical-electrical conductor assembly comprising: providing an optical waveguide that has an outer jacket layer; coating the jacket layer of the optical waveguide with a functional layer system; comprising: producing a base layer portion consisting of a single layer or a sequence of layers, comprising pretreating the jacket layer to produce a near-surface zone of the jacket layer having at least one altered surface property; depositing, on said base layer portion, an electrically conductive layer consisting of a single layer or a sequence of layers; and depositing, on said conductive layer, a barrier layer consisting of a single layer or a sequence of layers, the barrier layer being adapted to inhibit diffusion of oxygen and/or ions from acidic or alkaline solutions into the conductive layer or/and wherein a layer encompassed in the base layer portion is adapted to inhibit diffusion of oxygen and/or ions from acidic or alkaline solutions into the conductive layer.

A variant of the method accordingly relates to the producing of a base layer portion comprising a barrier layer and/or the depositing of a barrier layer on the conductive layer, with each of the barrier layers in particular adapted to inhibit the diffusion of oxygen, of ions from acidic or alkaline solutions, and/or of polymer constituents into the conductive layer.

The depositing of the electrically conductive layer on the base layer portion is also achieved by cathode sputter deposition, high-frequency sputter deposition, reactive sputter deposition and/or magnetron sputter deposition. Again, other coating processes may be employed besides cathode sputter deposition, in particular vacuum processes (e.g. vapor deposition, chemical vapor deposition (CVD, e.g. PECVD, especially PICVD)). The method step in particular allows to deposit, on the base layer portion, a conductive layer as described above in conjunction with the optical-electrical conductor assembly.

The coating of the jacket layer with a functional layer system may furthermore comprise to deposit, on the conductive layer, a barrier layer (passivation layer), and this barrier layer may be deposited as a single layer or a sequence of layers, and for this purpose it is again possible to employ in particular cathode sputter deposition, high-frequency sputter deposition, reactive sputter deposition and/or magnetron sputter deposition (or other coating techniques such as, e.g., the vacuum processes mentioned above or the processes based on a liquid phase mentioned above, such as, e.g., dip-coating or spray-coating). The barrier layer may also be useful to reduce the coefficient of friction. The method step in particular allows to deposit, on the conductive layer, a barrier layer as described above in conjunction with the optical-electrical conductor assembly.

The coating processes mentioned, in particular cathode sputter deposition processes, which can be used to deposit layers of the base layer portion, of the conductive layer, and/or of the barrier layer are preferably performed at temperatures below 50° C. This relatively low temperature in particular has the advantage that it allows to coat optical waveguides which have an outer polymer layer.

Preferably, at least two layers are produced and/or deposited in vacuum and without breaking the vacuum. Accordingly, for example, the base layer portion may first be produced in vacuum, and then the conductive layer may be applied in the same vacuum. Furthermore, a barrier layer may then be applied in the same vacuum.

The invention also relates to a medical technology device, in particular for dental treatment, which comprises an optical-electrical conductor assembly as described above. Such a medical technology device may, for example, be in the form of a medical technology fiber component, comprising an optical-electrical conductor assembly comprising an optical waveguide, e.g. a fused silica fiber, which optical waveguide is coated with a functional layer system. Such a device can be designed for endoscopic applications, for example, or for applications in the dental field (dental treatment).

The invention furthermore relates to an industrial technology device, in particular a device for level monitoring, in particular for containers or bioreactors, comprising an optical-electrical conductor assembly as described above. Such an industrial technology device may, for example, be used for industrial applications, e.g. for level sensors in containers, bioreactors, or for safety monitoring. In particular filling level monitoring is made possible, which allows to detect and assess an impedance change, depending on whether the fiber is immersed in a medium or not. Furthermore, penetration depth measurement is made possible, which allows to detect and evaluate an impedance change that depends on how far the fiber is immersed in a surrounding medium.

The invention finally relates to the use of an optical-electrical conductor assembly as described above for industrial engineering applications, in particular applications for level monitoring or safety monitoring. The invention also relates to the use of an optical-electrical conductor assembly as described above for measuring a penetration depth of the optical-electrical conductor assembly in a medium by measuring an impedance of the conductive layer in the surrounding medium. The impedance of the conductive layer changes in conjunction with the surrounding medium. Effective and reactive impedances add up in this case.

DETAILED DESCRIPTION

Figure 1:
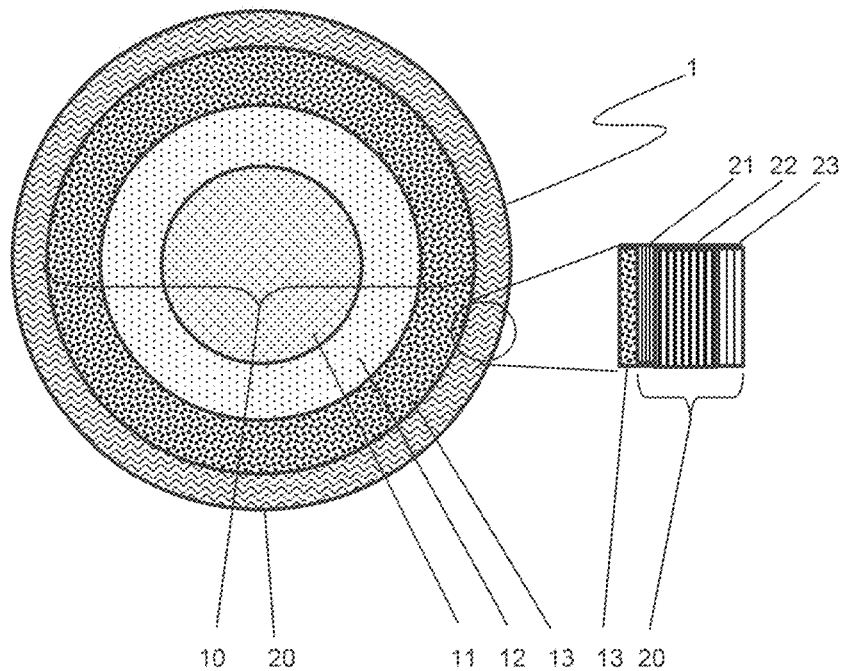
FIG. 1 is a cross-sectional view through an optical-electrical conductor assembly.

FIG. 1 shows an optical-electrical conductor assembly 1 comprising an optical waveguide 10. Optical waveguide 10 has a core 11 made of fused silica and a cladding 12 also made of fused silica here. The refractive index n1 of the core 11 is greater than the refractive index n2 of the cladding 12. In addition, and in particular as a mechanical protection, a jacket layer 13 (buffer) is provided in the form of a polymer layer or polymer jacket. As is common for such optical waveguides, the jacket layer 13 comprises polyimide, PMMA, or polyamide, or is made of at least one of these materials.

On the jacket layer 13, the optical-electrical conductor assembly 1 has a functional layer system 20 consisting, in this example, of a base layer portion 21 in the form of an adhesion promoting layer directly on the jacket layer 13, a conductive layer 22, and an outer barrier layer (passivation layer) 23. The functional layer system 20 on the outer jacket layer 13 can be produced by cathode sputter deposition or another vacuum deposition process (e.g. vapor deposition).

Figure 2:
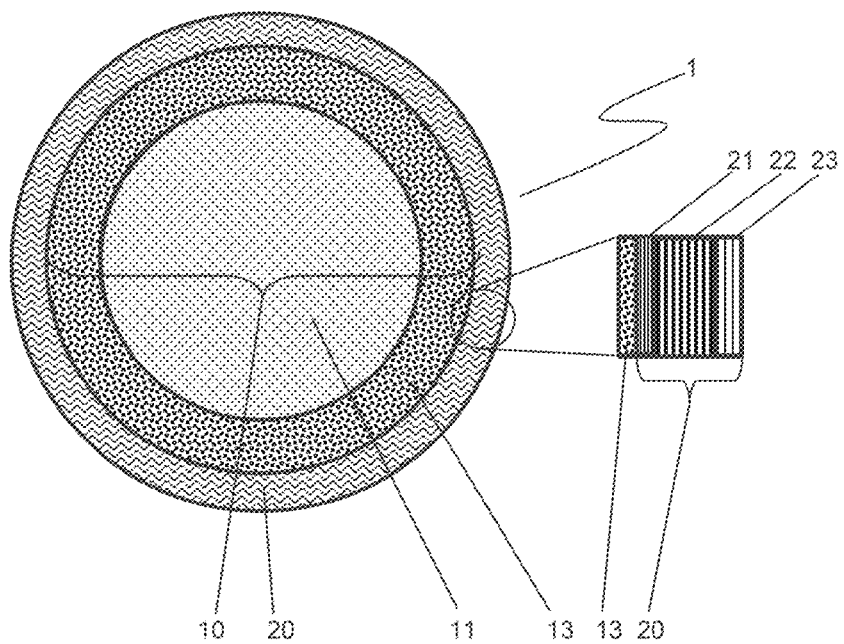
FIG. 2 is a cross-sectional view through another optical-electrical conductor assembly.

FIG. 2 shows an optical-electrical conductor assembly 1 comprising an optical waveguide 10, and in this case the optical waveguide 10 comprises a core 11 and a jacket layer 13 directly surrounding the core 11. In this case, the refractive index n1 of the core 11 is slightly greater than the refractive index n2 of the jacket layer 13. The jacket layer 13 thus provides for total internal reflection at the interface with the core 11 and thus for the conduction of light. At the same time, the jacket layer 13 may serve as a mechanical protective layer.

The optical-electrical conductor assembly 1 furthermore comprises a functional layer system 20 which may be designed and produced in the same way as in FIG. 1.

As mentioned above, the functional layer system 20 may comprise a plurality of individual layers which, in the present case, comprise a base layer portion 21 in the form of an adhesion promoting layer, the actual conductive layer 22, and an optional barrier layer (passivation layer) 23. With regard to the manufacturing of such an optical-electrical conductor assembly, the entire layer sequence can be deposited in a single batch cycle without interrupting the vacuum process, which also allows to cost-effectively coat in parallel a plurality of components that include such optical-electrical conductor assemblies 1.

Further exemplary embodiments for producing an optical-electrical conductor assembly are described below.

Example 1

Optical-electrical conductor assembly 1 comprising an optical waveguide 10 in the form of a fused silica fiber having a core 11 with a diameter of 150 µm, a cladding 12 with a diameter of 180 µm, and a jacket layer 13 in the form of a polymer layer made of polyimide, with an outer diameter of the optical waveguide 10 of approximately 210 µm in total.

A base layer portion was produced by subjecting the jacket layer to a pretreatment. Here, ultrasonic cleaning with an alkaline cleaning agent, a neutral cleansing agent, and IR drying were employed.

A conductive layer was deposited, consisting of a titanium coating with a thickness of 15 nm, which was produced by DC magnetron sputter deposition. Coating was performed in vacuum at a processing pressure of less than 1 E-2 mbar. The sputter target was chosen to have a purity of 99%. The minimum distance between substrate and target was chosen to be 5 cm, with the optical waveguide protruding into the plasma.

A 4-point measuring device was used to determine the sheet resistance, for which a value of 10 ohms/sq was measured (the unit ohms/sq corresponds to the unit ohm). This corresponds to a specific resistance of 1.5 E-5 ohm·cm. The adhesion of the layer system was verified using an adhesion test in compliance with DIN 58196-6(1995-07). No detachment of the functional layer system from the optical waveguide was found.

Example 2

An optical waveguide in the form of a quartz fiber with a jacket layer made of polyimide was cleaned and pre-activated by an atmospheric plasma in the form of a corona discharge. Then, a silicon oxide coating was deposited using a reactive medium-frequency plasma, which was provided with a conductive molybdenum coating with a layer thickness of 24 nm without vacuum break. This layer was then passivated with a silicon nitride coating with a layer thickness of 100 nm by reactive magnetron sputter deposition, without breaking the vacuum.

In a subsequent sheet resistance test, a sheet resistance of 5 ohms/sq was determined by an inductive measuring technique using an eddy current measuring device. According to the aforementioned adhesion test, no delamination was found.

Example 3

An optical waveguide in the form of a fused silica fiber with a jacket layer made of polyimide is cleaned by ultrasonic cleaning according to Example 1. The conductive layer disposed directly on the jacket layer comprises molybdenum with a sheet resistance of 10 ohms/sq. To protect the molybdenum coating, a barrier coating made of $TiO_2$ is optionally coated thereon. Both coatings are produced in a magnetron sputter deposition process in vacuum, with the optical waveguides protruding into the plasma so that a nearly homogeneous coating is created. In the case of the molybdenum coating, the coatings are made from a metallic sputter deposition target of purity 3N, in the case of the $TiO_2$ coating from a metallic target or a partially ceramic target while adding oxygen. In this case, the $TiO_2$ coating is partially amorphous and partially anatase. In a subsequent mechanical load test in which aluminum test specimens with a mass of 22.5 g are pulled over the length of the optical waveguide, no scratches or delamination of the metallic coating are found in light microscopic images of up to 100 times magnification.

Example 4

In a further exemplary embodiment, an optical waveguide in the form of a fused silica fiber and having a jacket layer made of polyimide is pretreated by wet-chemical cleaning. This is followed by the deposition of layers of both the base layer portion and the conductive layer while adding oxygen and argon. In order to ensure improved adhesion between the jacket layer and the conductive layer, an adhesion promoting layer made of $TiO_2$ is formed therebetween, and the ratio of oxygen to the total flow of oxygen and argon is less than 0.4 for producing it. Subsequently, a metallic titanium coating with a sheet resistance of 1 ohms/sq is deposited as a conductive coating, and the ratio of oxygen to the total flow of oxygen and argon is less than 0.1 for producing it. A further $TiO_2$ coating is deposited as an additional passivation, and the ratio of oxygen to the total flow of oxygen and argon is less than 0.7 for producing it.

The ratio of oxygen to the total flow (see the aforementioned exemplary ratios) indicates how close the result will be to a metal character or a dielectric character of the $TiO_2$ layer.

It will be apparent to a person skilled in the art that the embodiments described above are to be understood as examples and that the invention is not limited thereto, but rather can be varied in multiple ways without departing from the scope of the claims. Furthermore, the features of the optical-electrical conductor assembly are disclosed in a corresponding manner as features for the method for producing an optical-electrical conductor assembly and vice versa. Features, regardless of whether they are disclosed in the description, the claims, the figures, or otherwise, also individually define components of the invention, even if they are described together with other features.

LIST OF REFERENCE NUMERALS

1 Optical-electrical conductor assembly
10 Optical waveguide
11 Optically conductive core
12 Cladding
13 Organic jacket layer
20 Functional layer system
21 Base layer portion
22 Conductive layer
23 Barrier layer

What is claimed is:

1. An optical-electrical conductor assembly, comprising:
an optical waveguide having an outer organic jacket layer; and
a functional layer system located on the outer organic jacket layer, the functional layer system comprises a base layer portion and an electrically conductive layer disposed as a coating having a uniform thickness circumferentially on the base layer portion, the base layer portion is a single layer or a sequence of layers, the electrically conductive layer is a single layer or a sequence of layers, and
wherein the base layer portion comprises a near-surface zone of the outer organic jacket layer underneath the electrically conductive layer, the near-surface zone having a property selected from a group consisting of an increased surface energy, and an increased number of oxygen radicals.

2. The assembly of claim 1, further comprising an optically conductive core having a refractive index that is greater than a refractive index of the outer organic jacket layer.

3. The assembly of claim 1, further comprises a cladding surrounding the core, the cladding being disposed between the core and the outer organic jacket layer.

4. The assembly of claim 3, further comprising an optically conductive core having a refractive index that is greater than a refractive index of the cladding.

5. The assembly of claim 1, wherein the outer organic jacket layer comprises a material selected from a group consisting of polyamide (PA), polyimide (PI), polymethyl methacrylate (PMMA), wax, wax-like constituents, and alkylsilane.

6. The assembly of claim 1, wherein the base layer portion is disposed on the outer organic jacket layer, wherein the base layer portion comprises a material selected from a group consisting of an oxide, a boride, carbide, nitride, oxynitride, carbonitride, and a metal.

7. The assembly of claim 6, wherein the oxide is selected from a group consisting of $SiO_2$, $TiO_2$, $Al_2O_3$, $SnO_2$, and $HfO_2$, or wherein the metal is selected from a group consisting of Si, Ti, Mo, and Cr.

8. The assembly of claim 1, wherein the base layer portion has a thickness between 5 nm and 3000 nm and/or wherein the electrically conductive layer has a thickness between 5 nm and 6000 nm and/or wherein the electrically conductive layer has a sheet resistance between 0.01 and 1000 ohms/sq.

9. The assembly of claim 1, wherein the base layer portion and the electrically conductive layer have an adhesion therebetween that is greater than an adhesion between the outer organic jacket layer and another electrically conductive layer disposed thereon.

10. The assembly of claim 1, wherein the base layer portion has at least one layer configured to inhibit diffusion of oxygen and/or to inhibit ions from acidic or alkaline solutions into the electrically conductive layer.

11. The assembly of claim 1, wherein the base layer portion has a thermal expansion coefficient that is between a thermal expansion coefficient of the outer organic jacket layer and a thermal expansion coefficient of the electrically conductive layer.

12. The assembly of claim 1, wherein the base layer portion comprises the sequence of layers that have a respective coefficient of thermal expansion which increases or decreases according to the sequence of layers.

13. The assembly of claim 1, wherein the electrically conductive layer further comprises another layer disposed on the base layer portion, the another layer comprises a substance selected from a group consisting of titanium, silicon, aluminum, gold, silver, molybdenum, tungsten, zirconium, and an alloy thereof with an element selected from a group consisting of Ni, Zn, Y, Sn, and Ge.

14. The assembly of claim 1, wherein the functional layer system comprises a barrier layer disposed on the electrically conductive layer, wherein the barrier layer consists of a single layer or a sequence of layers, and wherein the barrier layer is configured to inhibit diffusion of oxygen and/or inhibit diffusion ions from acidic or alkaline solutions into the electrically conductive layer.

15. The assembly of claim 14, wherein the barrier layer has at least one layer with a hardness of at least 800 HV.

16. The assembly of claim 14, wherein the barrier layer comprises a layer disposed on the electrically conductive layer, wherein the barrier layer comprises a material selected from a group consisting of a nitride, an oxide, a carbide, boride, oxynitride, carbonitride, and a ternary system thereof, wherein the nitride is selected from a group consisting of $Si_3N_4$, BN, AlN, TiN, AlSiN, SiON, SiAlON, and any alloy thereof, wherein the oxide is selected from a group consisting of Si, Al, Ti, Zr, Zn, Sn, Ta, Nb, Y, $TiO_2$, and $SiO_2$.

17. The assembly of claim 1, wherein the assembly is configured for a use selected from a group consisting of a dental treatment device, a tissue treatment device, a tissue stimulation device, a container level monitoring device, and a bioreactor level monitoring device.

* * * * *